United States Patent [19]

Lin et al.

[11] 4,107,117
[45] Aug. 15, 1978

[54] TIRE CORD IMPREGNANT

[75] Inventors: Kingso C. Lin; Donald J. Hammond, both of Newark, Ohio

[73] Assignee: Owens-Corning Fiberglas Corporation, Toledo, Ohio

[21] Appl. No.: 747,130

[22] Filed: Dec. 3, 1976

[51] Int. Cl.² .............................................. C08L 91/00
[52] U.S. Cl. ...................... 260/28.5 B; 260/33.6 AQ; 260/33.6 UA; 260/42.15; 260/42.18; 428/378
[58] Field of Search ................. 260/28.5 B, 33.6 AQ, 260/33.6 UA, 42.15, 42.18; 428/378

[56] References Cited

U.S. PATENT DOCUMENTS

| 3,408,306 | 10/1968 | Boylan | 252/321 |
|---|---|---|---|
| 3,567,671 | 3/1971 | Janetos et al. | 260/28.5 B |
| 3,657,175 | 4/1972 | Zimmerman | 260/29.4 UA |
| 3,787,224 | 1/1974 | Uffner | 260/28.5 B |
| 3,817,775 | 6/1974 | Coakley et al. | 260/28.5 B |
| 3,930,095 | 12/1975 | van Gils et al. | 428/378 |

OTHER PUBLICATIONS

Skeist–Handbook of Adhesives (Reinhold) (N.Y.) (1962),-pp. 421-422.

*Primary Examiner*—Lewis T. Jacobs
*Attorney, Agent, or Firm*—Ronald C. Hudgens; Philip R. Cloutier

[57] ABSTRACT

A tire cord impregnant, particularly suited for coating glass fibers, is disclosed. The impregnant comprises a butadiene half ester methacrylic acid terpolymer and a blend of emulsifiable mineral oils, silica derivatives and esters.

10 Claims, No Drawings

TIRE CORD IMPREGNANT

This invention relates to tire cord impregnants.

In one of its more specific aspects, this invention relates to a glass tire cord in combination with an impregnant particularly suitable for glass tire cord. The use of this impregnant facilitates the production of glass tire cord by substantially eliminating dry dust dry-off.

The use of elastomeric product reinforced with fibers, and particularly glass fibers, is well known. Such products are employed as vehicular tires, drive belts, conveyor belts and the like.

As related to the use of glass fibers, the fibers are usually sized as formed and the individual fibers are plied with other strands and twisted to form yarns, threads or cords. The plurality of strands is then impregnated, usually with a latex derivative compatible with the elastomer. The strands are then dried to set the impregnant on the external surface of the glass bundle and thereafter are cured.

The cured strands are then mechanically twisted on a twist frame prior to their collection on a bobbin. During the twisting process, the cured strands are subjected to friction, that is, they come in contact with various parts of the twist frame. It is this friction that causes dry dust rub-off.

For the purposes of this invention, "dry dust rub-off" is understood to mean particles of cured imprengant removed from the cured strands by friction during the twisting process.

Various type tire cord impregnants can be used. Generally, these comprise combinations of resorcinol-formaldehyde resins in combination with various latexes such as neoprene rubber latex, polybutadiene latex, nitrilebutadiene latex, styrene-butadiene copolymer latex, vinylpyridine terpolymer latex and the like.

While the impregnant of this invention is employable with any reinforcing medium such as natural fibers, synthetic fibers, glass fibers and steel, its employment will be discussed herein in relation to glass fibers without intending to limit the invention thereto.

The impregnant of this invention is useable with any glass fibers. Preferably, it is used with E fibers having a diameter in the range of from about 0.35 to about 0.50 mil. The glass can be unsized or sized with conventional sizing employed for elastomer reinforcement.

The term "glass fibers" as used herein shall mean fibers formed by attenuation of one or more streams of molten glass and to strands formed when such glass fiber filaments are gathered together in forming. The term shall also means yarns and cords formed by plying and/or twisting a multiplicity of strands together and to woven and non-woven fabrics which are formed of such glass fiber strands, yarns or cords.

The term "glass fibers" shall also apply to fibers formed by high pressure fluids directed onto one or more streams of molten glass and to yarns that are formed when such fibers are allowed to gather on a surface from which the fibers are recovered in the form of a sliver which is drafted into a yarn. The term shall also refer to woven and non-woven fabrics formed of such yarns of discontinuous fibers and to combinations of such continuous and discontinuous fibers in strand, yarn cord and fabric formed therefrom.

As used herein, the term "elastomer" shall include natural rubber in the cured and uncured state, vulcanized or unvulcanized and synthetic organic elastomeric materials such as butadiene-styrene copolymer, butadieneacrylonitrile copolymer, chloroprene, isoprene, neoprene, isobutyl rubber and the like and elastomeric polymers and copolymers in their cured and uncured and vulcanized and unvulcanized stages.

According to this invention, there is provided at least one glass fiber coated with a residue obtained by drying an aqueous composition comprising a butadiene half ester methacrylic acid terpolymer and/or a blend of emulsifiable mineral oils, silica derivatives, and esters.

Also, according to this invention there is provided an impregnant composition comprising a butadiene half ester methacrylic acid terpolymer and/or a blend of emulsifiable mineral oils, silica derivatives, and esters.

In its preferred embodiment, this invention comprises at least one glass fiber coated with a residue obtained by drying an aqueous composition comprising a resorcinol-formaldehyde resin, a vinyl-pyridine terpolymer, a polybutadiene latex, a wax emulsion, a butadiene half ester methacrylic acid terpolymer and a blend of emulsifiable mineral oils, silica derivatives and esters.

Any suitable resorcinol-formaldehyde resin pre-condensate can be employed. Preferably, it will be produced employing from about 0.2 to about 0.8 mole of formaldehyde per mole of resorcinol and will contain a total solids content of about 75 weight percent. The resorcinol-formaldehyde resin pre-condensate will be employed in the composition in an amount within the range of from about 3 to about 4 weight percent of the residue produced by drying the composition.

A suitable pre-condensate can be formed as demonstrated hereinafter and suitable materials are available commercially, some being "Schenectady SRF 1524" available from Schenectady Chemicals, "Penacolite R2170" and "R2200" available from Koppers Co., Inc., Pittsburgh, Pa. and "Arofene 779" available from Ashland Chemical Co., Columbus, Ohio.

Any suitable vinylpyridine terpolymer can be employed. Preferably, it will be a terpolymer latex of butadiene, styrene and vinylpyridine comprised of about 70 weight percent butadiene, about 15 weight percent styrene and about 15 weight percent vinylpyridine. This material will be employed in an amount within the range of from about 10 to 60 weight percent of the residue produced by drying the composition.

One particularly suitable vinylpyridine is "Firestone FRS-5997", available from Firestone Synthetic Rubber and Latex Co. This material is a terpolymer latex of butadiene, styrene and vinylpyridine containing, by weight, 70% butadiene, 15% styrene and 15% vinylpyridine.

Any suitable polybutadiene latex can be used. Preferably, it will be a polybutadiene latex having a number average molecular weight within the range of from about 10,000 to about 2,000,000. This latex will be employed in an amount within the range of from about 30 to about 80 weight percent of the residue produced by drying the composition.

Particularly suitable polybutadiene latexes are "SR-5841" and "SR-272", available from Firestone Synthetic Rubber and Latex Co., Akron, Ohio.

One particularly suitable wax emulsion is "Vultex Wax Emulsion No. 15" available from General Latex and Chemical Corp., Cambridge, Mass.

Any suitable wax emulsion can be employed in the impregnant. "Vultex Wax Emulsion No. 15" contains about 75 weight percent paraffin wax and about 25 weight percent microcrystalline wax. The wax emulsion will be contained in the composition in an amount within the range of from about 4 to about 6 weight percent of the residue produced by drying the composition.

Any suitable butadiene half ester methacrylic acid terpolymer can be employed. Preferably, it will be employed in an amount of from about 0.1 to about 1.0 weight percent of the residue produced by drying the composition.

A particularly suitable butadiene half ester methacrylic acid terpolymer is "Tychem 9509", commercially available from Reichhold Polymers Inc., Dover, Delaware. Reference is hereby made to U.S. Pat. No. 3,657,175 which discloses a material which has been assigned the trade name "Tychem 9509".

Any suitable blend of emulsifiable mineral oils, silica derivatives, and esters can be employed. Preferably, it will be employed in an amount of from about 0.1 to about 1.0 weight percent of the residue produced by drying the composition.

A particularly suitable blend of emulsifiable mineral oils, silica derivatives, and esters is designated "Drew Y-250 Defoamer" available from Drew Chemical Corp., Parsippany, New Jersey. Reference is hereby made to U.S. Pat. No. 3,408,306 which discloses a material which has been assigned the trade name "Drew Y-250 Defoamer".

The dried impregnant of this intention, preferably, will also contain about 1 weight percent formaldehyde, about 0.9 weight percent ammonium hydroxide and about 0.1 weight percent potassium hydroxide.

The following example demonstrates the best mode for producing the impregnant of this invention and is based upon the preparation of 100 parts by weight of the wet impregnant.

EXAMPLE I

A resorcinol-formaldehyde resin premix solution was prepared by charging 3.5 parts of deionized water into a premix tank and adding 3.4 parts of commercial resorcinol-formaldehyde premix. The mixture was agitated for five minutes. Formaldehyde in an amount of 0.9 part was added and agitation was continued for thirty minutes. Thereupon, 3.0 parts of deionized water containing 0.2 part of potassium hydroxide were added and agitation was continued for 20 minutes.

Into a main mix tank, 27.5 parts of commercial butadiene-styrenevinylpyridine latex and 0.9 part of ammonium hydroxide were introduced. The mixture was agitated for ten minutes. The wax emulsion in the amount of 4.8 parts was added and agitation was continued for ten minutes. 54.9 parts of commercial polybutadiene latex were introduced into the mix tank with agitation. The previously-prepared resorcinol-formaldehyde resin premix was then introduced into the main mix tank over a period of 4 to 6 minutes. Mixing was continued thereafter for ten minutes. Thereafter, 0.5 part of a butadiene half ester methacrylic acid terpolymer (Tychem 9509) was added to the main mix tank. The mixture was agitated for forty-five minutes. A blend of emulsifiable mineral oils, silica derivatives and esters (Drew Y-250 Defoamer) in the amount of 0.5 part was added and agitation continued for fifteen minutes.

After aging for about two hours, the impregnant was suitable for use. It had a pH of about 10, a viscosity of about 900 cps, and a total solids content of about 45 weight percent.

The impregnant of this invention is applied to the glass fibers in the usual manner, for example, employing the procedure and apparatus disclosed in U.S. Pat. No. 3,424,608 to A. Marzocchi et al.

After application of the impregnant to the glass strand, the impregnant is air dried and cured in the usual manner, that is, for example, at 500° to 650° F for a period of about 5 to 10 seconds.

The glass fiber, or fibers, having the impregnant on at least a portion of its surface, can then be converted in yarns, rovings or fabrics in the form of packages and the like.

EXAMPLE II

The following data demonstrate the excellent dry dust rub-off of the impregnant of this invention.

A 2,000-gallon batch mix of impregnant was prepared according to the procedure of Example I, with the exception that the "Tychem 9509" and "Drew Y-250 Defoamer" were not added. The 2,000-gallon batch mix was then divided into three equal-volume parts (A, B, and C) and "Tychem 9509" and "Drew Y-250 Defoamer" were then added in parts per 100 parts by weight as follows:

|  | A | B | C |
|---|---|---|---|
| Tychem 9509 | 0 | 0.5 | 0.5 |
| Drew Y-250 Defoamer | 0 | 0 | 0.5 |

Three strands were prepared from E fibers having diameters in the range of from about 0.35 to about 0.50 mil. One strand was impregnated with the impregnant designated "A", one with the impregnant designated "B", and one with the impregnant designated "C". After each impregnated strand was cured, it was twisted on a twist frame for 25 minutes at a speed of 380 feet per minute and at a strand of about 250 – 300 grams. The dry dust rub-off resulting from twisting each impregnated strand was collected and weighed with the following results:

|  | Dry Dust Rub-off Collected (mg.) |
|---|---|
| Strand coated with Impregnant A | 632 |
| Strand coated with Impregnant B | 174 |
| Strand coated with Impregnant C | 3 |

It will be seen from the above data that the present invention acts to substantially reduce the dry dust rub-off of cured impregnant to a greater extent than does an impregnant not according to this invention.

It will be evident from the foregoing that various modifications can be made to the present invention. Such, however, are considered as being within the scope of the invention.

What is claimed is:

1. At least one glass fiber in contact with a residue produced by removing water from an aqueous composition comprising a butadiene ethoyxlated-alcohol, polycarboxylic acid anhydride half ester methacrylic acid terpolymer, a blend of emulsifiable mineral oils, silica derivatives and esters, a resorcinol-formaldehyde resin, a vinylpyridine terpolymer, a polybutadiene latex, and a wax emulsion.

2. The glass fiber of claim 1 in which said butadiene half ester methacrylic acid terpolymer is employed in an amount within a range of from about 0.1 to about 1.0 weight percent of said residue.

3. The glass fiber of claim 1 in which said blend of emulsifiable mineral oils, silica derivatives and esters is employed in an amount within a range of from about 0.1 to about 1.0 weight percent of said residue.

4. The glass fiber of claim 1 in which said residue comprises said resorcinol-formaldehyde resin in an amount within a range of from about 3 to about 4 weight percent of said residue, said vinylpyridine terpolymer in an amount within a range of from about 10 to 60 weight percent of said residue, said polybutadiene latex in an amount within a range of from about 30 to about 80 weight percent of said residue and said wax emulsion in an amount within a range of from about 4 to about 6 weight percent of said residue.

5. A composition comprising a butadiene ethoxylated-alcohol, polycarboxylic acid anhydride half ester methacrylic acid terpolymer, a blend of emulsifiable mineral oils, silica derivatives and esters, a resorcinol-formaldehyde resin, a vinylpyridine terpolymer, a polybutadiene latex, and a wax emulsion.

6. The composition of claim 5 in which said butadiene half ester methacrylic acid terpolymer is employed in an amount within a range of from about 0.1 to about 1.0 weight percent of a residue produced by drying said composition.

7. The composition of claim 5 in which said blend of emulsifiable mineral oils, silica derivatives and esters is employed in an amount within a range of from about 0.1 to about 1.0 weight percent of a residue produced by drying said composition.

8. The composition of claim 5 in which said resorcinol-formaldehyde resin is employed in an amount within a range of from about 3 to about 4 weight percent of a residue, said vinylpyridine terpolymer is employed in an amount within a range of from about 10 to about 60 weight percent of the residue, said polybutadiene latex is employed in an amount within a range of from about 30 to about 80 weight percent of the residue and said wax emulsion is employed in an amount within a range of from about 4 to about 6 weight percent of the residue, said residue being produced by drying said composition.

9. An elastomer reinforced with at least one glass fiber as defined in claim 1.

10. A method for producing cord suitable for the reinforcement of vehicular tires which comprises depositing an aqueous composition comprising a butadiene ethoxylated-alcohol, polycarboxylic acid anhydride half ester methacrylic acid terpolymer, a blend of emulsifiable mineral oils, silica derivatives and esters, a resorcinol-formaldehyde resin, a vinylpyridine terpolymer, a polybutadiene latex, and a wax emulsion, on glass fibers, drying said aqueous composition, and twisting said glass fibers into a cord.

* * * * *